Nov. 15, 1966  R. M. RICE  3,284,848

EXTRUDING APPARATUS

Filed Sept. 23, 1964  2 Sheets-Sheet 1

INVENTOR
RICHARD M. RICE

BY Glenn, Palmer & Matthews
ATTORNEY

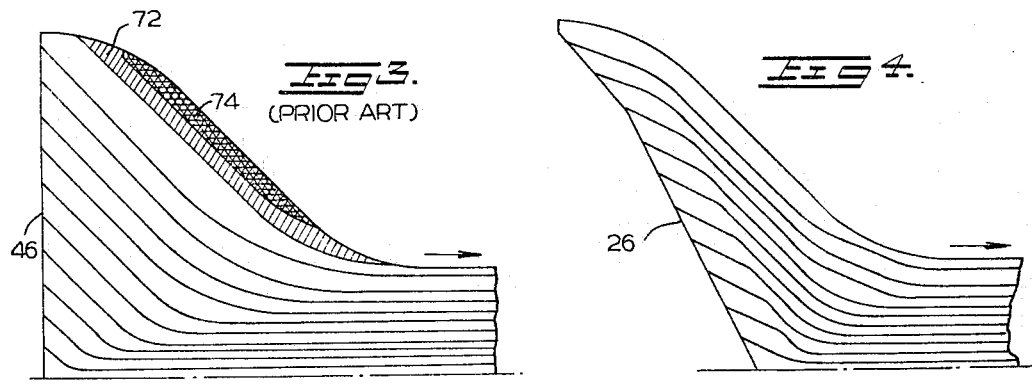
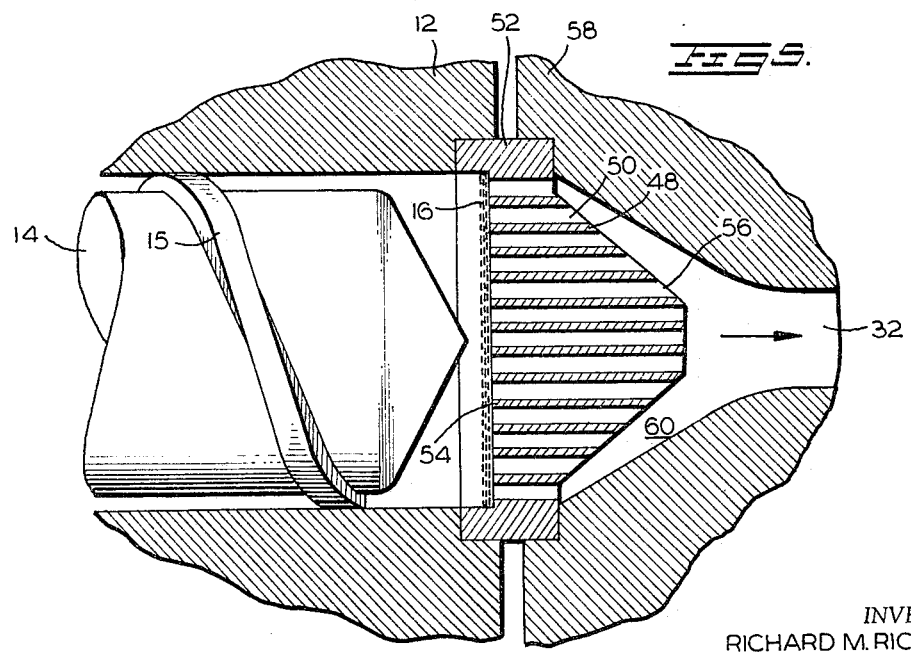

United States Patent Office 3,284,848
Patented Nov. 15, 1966

3,284,848
EXTRUDING APPARATUS
Richard M. Rice, Waynesboro, Va., assignor to Reynolds Metals Company, Richmond, Va., a corporation of Delaware
Filed Sept. 23, 1964, Ser. No. 398,661
7 Claims. (Cl. 18—12)

This invention relates to the extrusion of plastic materials and, more particularly, to the control of melt flow in the transition section between the barrel chamber and the die.

The extrusion of certain plastic materials, e.g., polyvinyl chloride, requires careful control of the streamlines of the plastic melt to prevent some sections from being retained for longer periods of time in the extrusion apparatus. Such unequal retention is undesirable for at least two major reasons: the resulting unequal temperatures make close gauge control difficult, if not impossible; and, more seriously, the sections subjected to longer retention times are prone to become sites of degradation and, as is well known, polyvinyl chloride degradation, once started, proceeds rapidly and is a primary determinate of continuous running time.

The object of this invention is to furnish a simple and practical means for controlling the melt flow in the transition zone. The advantages of this control are manifold and will be evident to one skilled in the art. Among the more important are the elimination of areas of sluggish or stagnant flow with the concomitant danger of thermal degradation, to provide an area of intense shear to promote homogenization of the melt, and to provide an area for equalizing temperatures of the melt arriving at the breaker plate from different parts of the barrel and screw.

Another object of this invention is to furnish a simple and inexpensive means of modifying the extrusion apparatus for handling materials with widely varying flow characteristics, obviating the necessity for expensive redesign of transition sections for products of varying formulations, as would be the case, as example, for high and low plasticizer-level PVC compositions.

The objects of this invention are attained by modifying the breaker plate in a manner to reduce the volume of the transition cavity, reducing the average residence time of the melt, and to deliver the melt streams from the breaker plate as close to the transition cavity wall as possible, drastically reducing the boundary layer, thereby eliminating relatively stagnant flow.

For a better understanding of the invention, and of its other details, objects, and advantages, reference is now made to the accompanying drawings, which show, for purposes of illustration only, a present preferred embodiment of the invention. In the drawings:

FIGURE 3 is a schematic diagram representing actual flow-line patterns existing at the downstream side of the breaker plate in the prior art apparatus shown in FIGURE 2;

FIGURE 4 is a schematic diagram representing actual flow-line patterns existing at the downstream side of the breaker plate in the apparatus according to the invention shown in FIGURE 1;

FIGURE 5 is a semi-diagrammatic, transverse section of a modification, which also embodies the invention, of a portion of the apparatus shown in FIGURE 1.

Figure 1:
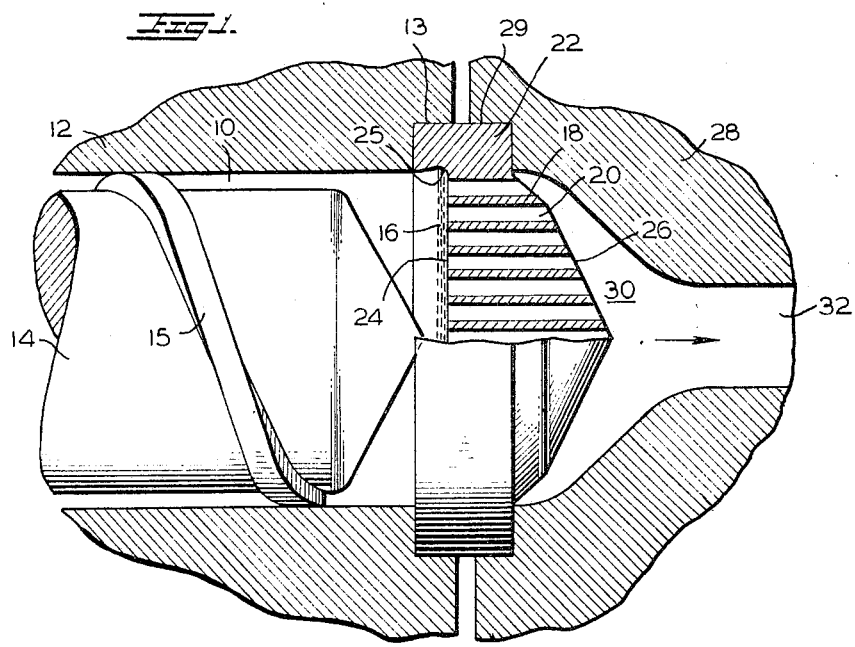
FIGURE 1 is a semi-diagrammatic, transverse, partial section of a portion of a plastic material-extruding apparatus embodying the invention.

As is shown in FIGURE 1, thread 15 of rotating screw 14 closely fits within cavity 10 in extruder barrel 12. One side of flange 22 of breaker plate 18 fits within recess 13 in the end of barrel 12, while the other side of flange 22 fits into recess 29 in transition piece 28. Barrel 12 and transition piece 28 are urged together by suitable mechanical means (not shown) so that each forms a seal with flange 22. Breaker plate 18 has a flat rear surface 24, passages 20 extending therethrough, and a front surface 26 which protrudes forwardly at its center into transition cavity 30 in transition piece 28. Passages 20 may be parallel and of circular, oblong, square, or other suitable cross-section. The cross-section of transition cavity 30 corresponds at its rearward end to that of cavity 10, and gradually decreases until cavity 30 has led into die entrance channel 32. Screen pack 16 fits into recess 25 at the rear of breaker plate 18.

In the operation of the extruder, the plastic material to be extruded, e.g., polyvinyl chloride, is initially fed into the cavity 10 and moved by the rotating screw 14 forwardly through a heating zone, where it is melted. (The feeding and heating zones are not shown, but would be to the left of the portion of the apparatus shown in FIGURE 1). The thread 15 of the rotating screw 14 continues to force the PVC through the cavity 10 toward the right in a forward, or "downstream," direction. After being filtered as it passes through screen pack 16, the PVC proceeds through passages 20 in breaker plate 18, thereby sustaining intense shearing forces which homogenize it. In addition, the breaker plate supports the screen pack 16 and serves to equalize the temperatures and pressures of the melt, since portions thereof are arriving at rear surface 24 of breaker plate 18 from different parts of the screw 14 and cavity 10. Leaving passages 20, the PVC passes though the transition cavity 30 of progressively decreasing cross-section, through die entrance channel of relatively small cross-section, and finally into a die (not shown). A discussion of certain details of plastic material-extruding apparatus with which this invention is not immediately concerned may be found in an article by Harold S. Sponaugle entitled "Extrusion" and published on pages 14–19 of the June 1961 issue of Plastics Design & Processing.

Figure 2:
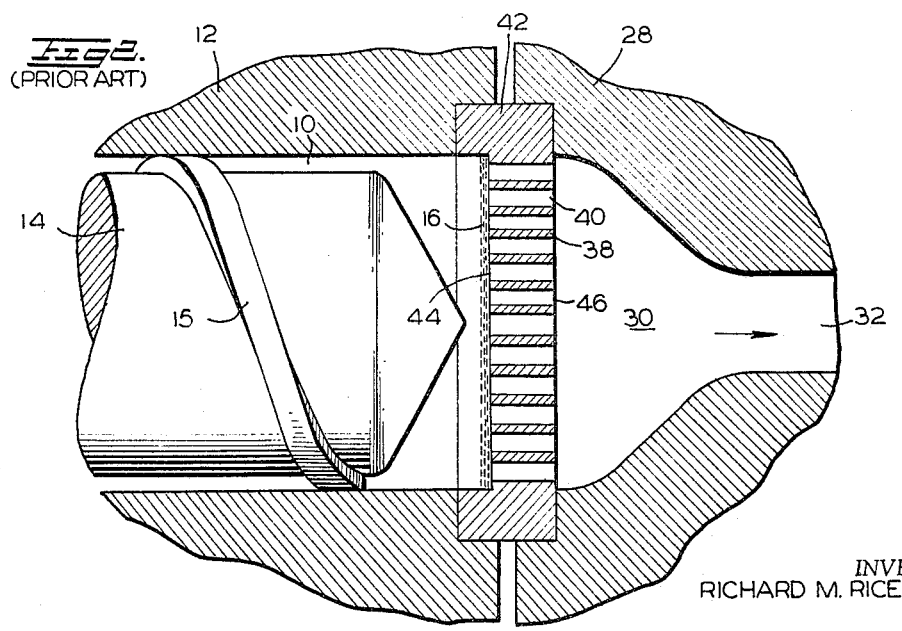
FIGURE 2 is a semi-diagrammatic, transverse section of a portion of a plastic material-extruding apparatus made in accordance with the prior art.

The above-described apparatus embodying the invention differs from the prior art apparatus primarily in the design of its breaker plate. Prior art breaker plate 38, shown in FIGURE 2, has passages 40, flange 42, flat rear surface 44, and flat front surface 46. It has been found that this prior art apparatus could not operate continuously because it retained portions of the PVC melt. This not only made temperature control difficult, but also resulted in thermal degradation of these portions. Once started, the degradation progressed rapidly until it became necessary to cease operating the extruding apparatus. Thus, after each four hour period of running time, transition piece 28 had to be disconnected from barrel 12 and transition cavity 30 cleaned, breaker plate 38 removed and cleaned, and the apparatus re-assembled for another period of operation. This obviously resulted in excessive down time, effort, and cycling of the apparatus. It has been found that this retention begins in a location adjacent the walls of transition cavity 30, as is shown in FIGURE 3, where boundary layer 74 has become thoroughly sluggish and degraded and intermediate layer 72 has become partially sluggish and degraded. Other examples of prior art apparatus may be found in U.S. Patent No. 2,952,871 to Loeser and U.S. Patent No. 3,032,-822 to Maddock.

One solution to the problem would be to redesign transition piece 28. Since the likelihood and degree of retention depend upon the properties of the material to be extruded and the extruding conditions, as well as upon the configuration of transition piece 28, this solution would involve the design and production of a number of different transition pieces 28 to satisfy these various combinations of properties and conditions. If the cross-section of the transition cavity 30 decreases along its length too rapidly for a given set of such properties and conditions, the overall flow resistance of the transition piece 28 will become excessive and/or flow of boundary layer 74 will become constricted, resulting in retention and degradation. On the other hand, if the cross-section decreases too gradually, velocities through transition cavity 30 and die entrance channel 32 will become insufficient to prevent degradation. Also, a transition piece 28, being ordinarily made of chrome-plated steel, is relatively expensive. In short, this solution would require precise, difficult, and expensive design and production of a number of transition pieces 28.

It has been determined in accordance with the invention that a different solution is far more satisfactory. The inventive solution involves extending the front surface 26 of breaker plate 18 forwardly to the location shown in FIGURE 1, to bring the exits of passages 20 as close to the transition cavity 30 walls as possible without clogging the common exit path and creating excessive pressure in transition cavity 30. The flow line patterns which are achieved by the invention are shown in FIGURE 4. The objectionable retention and degradation are thereby eliminated with only a slight increase in the pressure drop across this portion of the apparatus. The inventive solution has proven so satisfactory that it is no longer necessary to cease operating the extruding apparatus in order to remove the degraded material. The apparatus will operate continuously, being shut down every 24 hours only for other maintenance reasons. In addition, the extruded material is cleaner and has improved color characteristics. Since breaker plates are relatively easy to produce and, being made of carbon steel, are relatively inexpensive, a number of breaker plates having different front surface configurations can be designed and produced as necessitated by varying properties of the material to be extruded and varying extruding conditions.

It has been further discovered that the provision of breaker plates in accordance with this invention facilitates the design and production of transition pieces. Shown in FIGURE 5 is a particular breaker plate 48 having passages 50, flange 52, flat rear surface 54, and protruding front surface 56. Since breaker plate 48 can be designed to eliminate retention and degradation, transition piece 58 need no longer be of the carefully curving profile of transition piece 28, but may be of a generally conical shape and hence more easily manufactured.

While I have illustrated and described present preferred embodiments of the invention and methods of practicing the same, it will be understood that the invention may be otherwise variously embodied and practiced within the scope of the following claims.

What is claimed is:
1. Apparatus for extruding plastic material comprising: internal walls defining a transition cavity having over at least a portion of its length a region whose cross-section decreases in the direction of flow of said material to be extruded, a breaker plate extending across said cavity upstream of at least a part of said region with the axis of said breaker plate parallel to said direction of flow, said breaker plate having an upstream surface, a downstream surface protruding at its center downstream into said region, and a plurality of passages extending through said plate from said upstream surface to said downstream surface, the downstream ends of said passages nearer said axis being disposed downstream of the downstream ends of most of the remaining said passages so that all of said material to be extruded can pass smoothly through said region without being retained in said region.

2. The apparatus of claim 1 wherein the distance, along a plane perpendicular to said axis, between said downstream surface of said breaker plate and said internal walls defining said region increases in the downstream direction.

3. The apparatus of claim 1 wherein said upstream surface is flat and perpendicular to said axis and supports a screen pack.

4. The apparatus of claim 1 wherein said upstream and downstream surfaces of said breaker plate are symmetric about said axis.

5. The apparatus of claim 1 wherein said passages are parallel.

6. The apparatus of claim 1 wherein a major portion of said downstream surface of said breaker plate is conical.

7. Apparatus for extruding plastic material comprising: a generally conical transition cavity whose cross-section decreases in the direction of flow of material to be extruded, a breaker plate extending across the upstream end of said transition cavity with its axis parallel to said direction of flow, said breaker plate having an upstream surface, a generally conical downstream surface protruding at its center into said transition cavity, and a plurality of passages extending through said plate from said upstream surface to said downstream surface, the conical angle of said downstream surface of said breaker plate being greater than the conical angle of said transition cavity.

References Cited by the Examiner
UNITED STATES PATENTS

| | | | |
|---|---|---|---|
| 2,291,212 | 7/1942 | Clinefelter | 18—12 |
| 2,923,972 | 2/1960 | De Ghetto | 18—12 |
| 3,145,746 | 8/1964 | Scher | 18—12 X |

WILLIAM J. STEPHENSON, *Primary Examiner.*